(12) United States Patent
Araki et al.

(10) Patent No.: US 10,011,748 B2
(45) Date of Patent: Jul. 3, 2018

(54) ADHESIVE COMPOSITION

(71) Applicant: The Yokohama Rubber Co., LTD., Minato-ku, Tokyo (JP)

(72) Inventors: Kiminori Araki, Hiratsuka (JP); Miyuki Ariizumi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/563,524

(22) PCT Filed: Mar. 31, 2016

(86) PCT No.: PCT/JP2016/060661
§ 371 (c)(1),
(2) Date: Sep. 29, 2017

(87) PCT Pub. No.: WO2016/159237
PCT Pub. Date: Oct. 6, 2016

(65) Prior Publication Data
US 2018/0086956 A1    Mar. 29, 2018

(30) Foreign Application Priority Data
Mar. 31, 2015 (JP) .................................. 2015-073552

(51) Int. Cl.
*C09J 175/04* (2006.01)
*C09J 11/04* (2006.01)
(Continued)

(52) U.S. Cl.
CPC ............. *C09J 175/04* (2013.01); *B01J 23/14* (2013.01); *C08G 71/04* (2013.01); *C08K 3/04* (2013.01); *C08K 3/26* (2013.01); *C08K 5/357* (2013.01); *C09J 11/04* (2013.01); *C09J 11/06* (2013.01); *C08G 2190/00* (2013.01); *C08K 2003/287* (2013.01)

(58) Field of Classification Search
CPC ...................................................... C09J 175/04
See application file for complete search history.

(56) References Cited

FOREIGN PATENT DOCUMENTS

| JP | 2010-168435 | 8/2010 |
| JP | 2010168435 A * | 8/2010 |

(Continued)

OTHER PUBLICATIONS

International Search Report for International Application No. PCT/JP2016/060661 dated Jun. 28, 2016, 2 pages, Japan.

*Primary Examiner* — Daniel H Lee
(74) *Attorney, Agent, or Firm* — Thorpe North & Western

(57) ABSTRACT

The present technology provides an adhesive composition containing a urethane prepolymer (UP), plural types of carbon blacks (CB), calcium carbonate, aliphatic isocyanate, a metal catalyst, and an amine catalyst, wherein first and second CBs have dibutyl phthalate oil absorptions of from 23 to 40 $cm^3/100$ g and from 85 to 120 $cm^3/100$ g, respectively; contents 1 and 2 of the first and second CBs are respectively not less than 25 parts by mass and not less than 9 parts by mass per 100 parts by mass of the UP; a content of the calcium carbonate is from 5 to 30 parts by mass per 100 parts by mass of the UP, and from 5 to 50 parts by mass per 100 parts by mass of a sum of the contents 1 and 2.

13 Claims, 1 Drawing Sheet

(51) Int. Cl.
*C09J 11/06* (2006.01)
*C08G 71/04* (2006.01)
*C08K 3/26* (2006.01)
*C08K 5/357* (2006.01)
*B01J 23/14* (2006.01)
*C08K 3/04* (2006.01)
*C08K 3/28* (2006.01)

(56) References Cited

FOREIGN PATENT DOCUMENTS

| WO | WO 2014-196303 | 12/2014 |
| WO | WO 2014-203750 | 12/2014 |

* cited by examiner

ADHESIVE COMPOSITION

TECHNICAL FIELD

The present technology relates to an adhesive composition.

BACKGROUND ART

The window glass of an automobile has been conventionally attached to the body via a rubber gasket.

However, since the ability of a rubber gasket to hold the glass at the time of a collision is low, the window glass is currently attached directly to a painted body using an adhesive without an intervening gasket. Examples of methods for adhering the window glass to a painted body without an intervening gasket include a direct glazing method, in which a laminated glass and a body are bonded together via an adhesive layer.

In the direct glazing method, a one-part adhesive composition containing a urethane prepolymer is generally used.

The present applicant has proposed International Patent Application Publication No. WO 2014/203750 as a one-part moisture-curable polyurethane composition.

Under these circumstances, a composition containing a urethane prepolymer was prepared based on International Patent Application Publication No. WO 2014/203750 and evaluated. It was found that such a composition exhibits poor friction stability.

Poor friction stability of a composition may cause malfunction of pump shutdown due to solidification of the composition in the pump during transporting the composition with the pump.

SUMMARY

The present technology provides an adhesive composition that exhibits excellent friction stability.

As a result of research, the present inventors have discovered that a predetermined effect can be achieved by an adhesive composition containing, as carbon blacks, plural types of carbon blacks in specific content ranges, each carbon black having specific ranges of dibutyl phthalate oil absorption, whereby accomplishing the present technology.

The present technology is based on the knowledge above and the like, and specifically uses the configurations below.

1. A one-part moisture curing-type adhesive composition containing a urethane prepolymer, carbon black, calcium carbonate, aliphatic isocyanate, a metal catalyst, and an amine catalyst, wherein the carbon black contains plural types of carbon blacks;

a first carbon black has a dibutyl phthalate oil absorption of from 23 to 33 $cm^3/100$ g;

a second carbon black has a dibutyl phthalate oil absorption of from 95 to 120 $cm^3/100$ g;

a content 1 of the first carbon black is not less than 45 parts by mass per 100 parts by mass of the urethane prepolymer;

a content 2 of the second carbon black is not less than 9 parts by mass per 100 parts by mass of the urethane prepolymer;

a content of the calcium carbonate is from 5 to 30 parts by mass per 100 parts by mass of the urethane prepolymer; and a content of the calcium carbonate is from 5 to 50 parts by mass per 100 parts by mass of a sum of the content 1 and the content 2.

2. The adhesive composition according to 1 above, wherein the content 1 and the content 2 satisfy the following relationships (a) and (b):

$$11 \times content\ 1 + 20 \times content\ 2 \geq 1080;\ and \qquad \text{Relationship (a)}$$

$$2 \times content\ 1 + 55 \times content\ 2 \geq 710. \qquad \text{Relationship (b)}$$

3. The adhesive composition according to 1 or 2 above, wherein the content 1 and the content 2 satisfy the following relationships (c) and (d):

$$1 \times content\ 1 + 35 \times content\ 2 \leq 1165;\ and \qquad \text{Relationship (c)}$$

$$21 \times content\ 1 + 19 \times content\ 2 \leq 2985. \qquad \text{Relationship (d)}$$

4. The adhesive composition according to any one of 1 to 3 above, wherein the aliphatic isocyanate is a trifunctional compound A that is modified from hexamethylene diisocyanate.

5. The adhesive composition according to any one of 1 to 4 above, wherein the content of the aliphatic isocyanate is from 4 to 14 parts by mass per 100 parts by mass of the urethane prepolymer.

6. The adhesive composition according to any one of 1 to 5 above, wherein the metal catalyst comprises an organotin catalyst.

7. The adhesive composition according to any one of 1 to 6 above, wherein the content of the metal catalyst is from 0.0004 to 0.03 parts by mass per 100 parts by mass of the urethane prepolymer.

8. The adhesive composition according to any one of 1 to 7 above, wherein the amine catalyst has a dimorpholinodiethylether structure.

9. The adhesive composition according to any one of 1 to 8 above, wherein the content of the amine catalyst is from 0.02 to 0.4 parts by mass per 100 parts by mass of the urethane prepolymer.

10. The adhesive composition according to any one of 1 to 9 above further containing a third carbon black, wherein a value of k×w (the product of k and w) is not less than 0 and not greater than 500, where k is a dibutyl phthalate oil absorption of the third carbon black in $cm^3/100$ g, and w is a content of the third carbon black in parts by mass per 100 parts by mass of the urethane prepolymer.

[1] A one-part moisture curing-type adhesive composition containing a urethane prepolymer, carbon black, calcium carbonate, aliphatic isocyanate, a metal catalyst, and an amine catalyst, wherein the carbon black contains plural types of carbon blacks;

a first carbon black has a dibutyl phthalate oil absorption of from 23 to 40 $cm^3/100$ g;

a second carbon black has a dibutyl phthalate oil absorption of from 85 to 120 $cm^3/100$ g;

a content 1 of the first carbon black is not less than 25 parts by mass per 100 parts by mass of the urethane prepolymer;

a content 2 of the second carbon black is not less than 9 parts by mass per 100 parts by mass of the urethane prepolymer;

a content of the calcium carbonate is from 5 to 30 parts by mass per 100 parts by mass of the urethane prepolymer; and a content of the calcium carbonate is from 5 to 50 parts by mass per 100 parts by mass of a sum of the content 1 and the content 2.

[2] The adhesive composition according to [1], wherein the content 1 is not greater than 140 parts by mass per 100 parts by mass of the urethane prepolymer.

[3] The adhesive composition according to [1] or [2], wherein the content 2 is not greater than 45 parts by mass per 100 parts by mass of the urethane prepolymer.

[4] The adhesive composition according to any one of [1] to [3] above, wherein the aliphatic isocyanate is a trifunctional compound A that is modified from hexamethylene diisocyanate.

[5] The adhesive composition according to any one of [1] to [4] above, wherein the content of the aliphatic isocyanate is from 4 to 14 parts by mass per 100 parts by mass of the urethane prepolymer.

[6] The adhesive composition according to any one of [1] to [5] above, wherein the metal catalyst comprises an organotin catalyst.

[7] The adhesive composition according to any one of [1] to [6] above, wherein the content of the metal catalyst is from 0.0004 to 0.03 parts by mass per 100 parts by mass of the urethane prepolymer.

[8] The adhesive composition according to any one of [1] to [7] above, wherein the amine catalyst has a dimorpholinodiethylether structure.

[9] The adhesive composition according to any one of [1] to [8] above, wherein the content of the amine catalyst is from 0.02 to 0.4 parts by mass per 100 parts by mass of the urethane prepolymer.

[10] The adhesive composition according to any one of [1] to [9] above further comprising a third carbon black, wherein a value of k×w is not greater than 650, where k is a dibutyl phthalate oil absorption of the third carbon black in $cm^3/100$ g, and w is a content of the third carbon black in parts by mass per 100 parts by mass of the urethane prepolymer.

[11] The adhesive composition according to any one of [1] to [10] above, wherein the content 1 and the content 2 satisfy the following relationships (a) to (d), or the following relationships (e) to (h):

| | |
|---|---|
| 11×content 1+20×content 2≥1080; | Relationship (a) |
| 2×content 1+55×content 2≥710; | Relationship (b) |
| 1×content 1+35×content 2≤1165; | Relationship (c) |
| 21×content 1+19×content 2≤2985; | Relationship (d) |
| 59×content 2<−4×content 1+2694; | Relationship (e) |
| 2×content 2<−11×content 1+1004; | Relationship (f) |
| 16×content 2>−1×content 1+376; and | Relationship (g) |
| 15×content 2>−23×content 1+1235. | Relationship (h) |

[12] The adhesive composition according to any one of [1] to [11] above, wherein the dibutyl phthalate oil absorption of the first carbon black is from 23 to 33 $cm^3/100$ g; the dibutyl phthalate oil absorption of the second carbon black is from 95 to 120 $cm^3/100$ g; and the content 1 and the content 2 satisfy the following relationships (a) to (d):

| | |
|---|---|
| 11×content 1+20×content 2≥1080; | Relationship (a) |
| 2×content 1+55×content 2≥710; | Relationship (b) |
| 1×content 1+35×content 2≤1165; and | Relationship (c) |
| 21×content 1+19×content 2≤2985. | Relationship (d) |

[13] The adhesive composition according to any one of [1] to [11] above, wherein the dibutyl phthalate oil absorption of the first carbon black is from 28 to 40 $cm^3/100$ g; the dibutyl phthalate oil absorption of the second carbon black is from 85 to 115 $cm^3/100$ g; and the content 1 and the content 2 satisfy the following relationships (e) to (h):

| | |
|---|---|
| 59×content 2<−4×content 1+2694; | Relationship (e) |
| 2×content 2<−11×content 1+1004; | Relationship (f) |
| 16×content 2>−1×content 1+376; and | Relationship (g) |
| 15×content 2>−23×content 1+1235. | Relationship (h) |

The adhesive composition of the present technology exhibits excellent friction stability.

DETAILED DESCRIPTION

Figure 1:
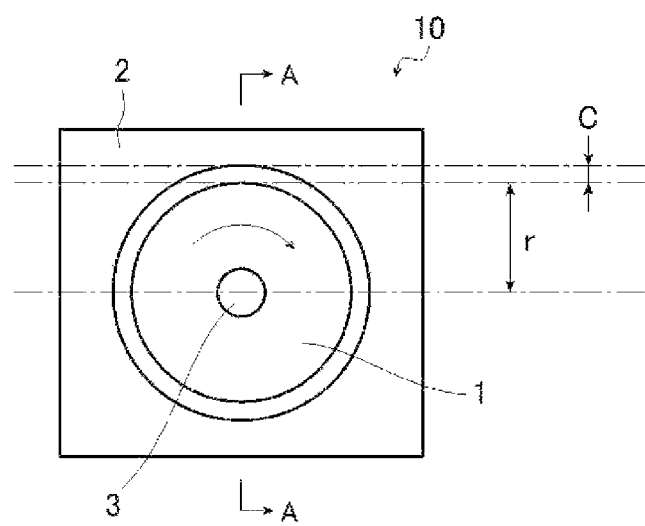
FIG. 1 is a schematic plan view of the interior of the instrument used for evaluation of friction stability in shear mode in Examples of the present technology.

Embodiments of the present technology are described in detail below.

Note that, in the present specification, a numerical range represented by the expression "(from) . . . to . . . " indicates a range of numbers, in which the former number is the lower limit value (inclusive) and the later number is the upper limit value (inclusive).

Also, in the present specification, if a component contains two or more types of materials, the "content" of the component refers to the total content of the two or more types of the materials.

Also, in the present specification, (meth)acrylate represents either acrylate or methacrylate, (meth)acryloyl is either acryloyl or methacryloyl and (meth)acryl represents either acryl or methacryl.

An adhesive composition of the present technology (a composition of the present technology) is a one-part moisture curing-type adhesive composition containing a urethane prepolymer, carbon black, calcium carbonate, aliphatic isocyanate, a metal catalyst, and an amine catalyst, wherein the carbon black contains plural types of carbon blacks;

a first carbon black has a dibutyl phthalate oil absorption of from 23 to 40 $cm^3/100$ g;

a second carbon black has a dibutyl phthalate oil absorption of from 85 to 120 $cm^3/100$ g;

a content 1 of the first carbon black is not less than 25 parts by mass per 100 parts by mass of the urethane prepolymer;

a content 2 of the second carbon black is not less than 9 parts by mass per 100 parts by mass of the urethane prepolymer;

a content of the calcium carbonate is from 5 to 30 parts by mass per 100 parts by mass of the urethane prepolymer; and a content of the calcium carbonate is from 5 to 50 parts by mass per 100 parts by mass of a sum of the content 1 and the content 2.

The composition of the present technology is thought to achieve desired effects as a result of having such a configuration. Although the reason for this is unknown, the reason is presumed to be as follows.

In general, during transporting a composition containing urethane prepolymer, calcium carbonate, and carbon black with a pump, the motion of calcium carbonate is slow when the composition is passing through a thin gap in the pump. This results in separation of calcium carbonate from the composition at the thin gap and increase in calcium carbonate concentration at the thin gap. Consequently, it is considered that the material at the thin gap may shift to the alkaline side and heat due to friction and the like may prompt reaction of the urethane prepolymer to solidify the composition.

In contrast, the composition of the present technology contains carbon blacks in specific contents; carbon black having dibutyl phthalate oil absorption of from 95 to 120 cm$^3$/100 g and carbon black having dibutyl phthalate oil absorption of from 23 to 33 cm$^3$/100 g, thereby suppressing the separation described above, can be transferred uniformly in a pump, and is less likely to undergo a reaction due to heat. Thus, the present inventors consider that the composition of the present technology exhibits excellent friction stability.

Each component contained in the composition of the present technology will be described in detail below.
Adhesive composition
Urethane prepolymer The urethane prepolymer contained in the composition of the present technology is not particularly limited as long as the urethane prepolymer is a urethane prepolymer having an isocyanate group at a terminal. Examples that can be used as the urethane prepolymer are those obtained by reacting polyisocyanate with a compound having two or more active hydrogen-containing groups per molecule (active hydrogen compounds) so that the amount of the isocyanate groups contained in the polyisocyanate is in excess relative to the amount of the active hydrogen-containing groups contained in the active hydrogen compound. The urethane prepolymer may contain from 0.5 to 5 mass % of the isocyanate group at the molecular terminal based on the total mass of the urethane prepolymer.

The polyisocyanate used in the production of the urethane prepolymer is not particularly limited as long as the polyisocyanate has two or more isocyanate groups per molecule.

The polyisocyanate used in the production of the urethane prepolymer includes, for example, aromatic polyisocyanates, such as tolylene diisocyanate (TDI), diphenylmethane diisocyanate (MDI; e.g., 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates (including alicyclic polyisocyanates), such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanate methyl)cyclohexane (H$_6$XDI), and dicyclohexylmethane diisocyanate (H$_{12}$MDI); carbodiimide-modified polyisocyanates thereof; and isocyanurate-modified polyisocyanates thereof.

The polyisocyanate each can be used alone or in combination of two or more types thereof.

Among these, an aromatic polyisocyanate is preferable, and MDI is more preferable, for the reason of excellent curability.

The compound having two or more active hydrogen-containing groups per molecule (active hydrogen compound) used in the production of the urethane prepolymer is not particularly limited. The active hydrogen-containing group includes, for example, a hydroxy (OH) group, an amino group, and an imino group.

The active hydrogen compound includes, for example, preferably polyol compounds having two or more hydroxy (OH) groups per molecule, and the like, and particularly polyol compounds are preferable.

The polyol compound used in the production of the urethane prepolymer is not particularly limited as long as the polyol compound is a compound having two or more hydroxy groups. It includes, for example, polyether polyols; polyester polyols; polymer polyols having a carbon-carbon bond in the main backbone chain, such as acrylic polyols, polybutadiene diols, and hydrogenated polybutadiene polyols; low-molecular-weight polyhydric alcohols; and mixed polyols thereof. Among them, polyether polyol is mentioned as an example of a preferable aspect.

The polyether polyol is not particularly limited as long as it is a compound having a polyether as the main chain and having two or more hydroxy groups. The polyether is a group having two or more ether bonds, and specific examples thereof include a group having a total of two or more of the structural units: —$R^a$—O—$R^b$—, wherein $R^a$ and $R^b$ each independently represent a hydrocarbon group. The hydrocarbon group is not particularly limited. It includes, for example, a straight-chain alkylene group having from 1 to 10 carbons.

The polyether polyol includes, for example, polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), polytetraethylene glycol, sorbitol-based polyol, and the like.

The polyether polyol is preferably polypropylene glycol or polyoxypropylene triol from the perspective of excellent miscibility with polyisocyanate.

The weight average molecular weight of the polyether polyol is preferably from 500 to 20000 from the perspective that the viscosity of the urethane prepolymer resulting from a reaction with isocyanate can provide an appropriate fluidity at room temperature. In the present technology, the weight average molecular weight above is a value obtained by GPC analysis (solvent: tetrahydrofuran (THF)) based on calibration with polystyrene.

The active hydrogen compound each can be used alone or in combination of two or more types thereof.

The urethane prepolymer is preferably a urethane prepolymer formed by reacting a polyether polyol and an aromatic polyisocyanate, from the perspective of achieving superior adhesion and excellent curability, and more preferably a urethane prepolymer obtained by reacting at least one type selected from the group consisting of polyoxypropylenediol and polyoxypropylenetriol with diphenylmethane diisocyanate.

The urethane prepolymer each can be used alone or in combination of two or more types thereof.

The method of producing the urethane prepolymer is not particularly limited. For example, the urethane prepolymer can be produced by using polyisocyanate in a manner that from 1.5 to 2.5 mol of isocyanate group is reacted per 1 mol of the active hydrogen-containing group (e.g. hydroxy group) contained in the active hydrogen compound, and mixing them to allow them to react.

Carbon Black

The composition of the present technology contains plural types of carbon blacks as the carbon black. That is, the composition of the present technology contains at least a first carbon black and a second carbon black as the carbon black.

First Carbon Black

In the present technology, the first carbon black has dibutyl phthalate oil absorption (DBP oil absorption) of from 23 to 40 $cm^3/100$ g.

The DBP oil absorption of the first carbon black is preferably from 23 to 33 $cm^3/100$ g and more preferably from 27 to 30 $cm^3/100$ g in achieving superior effect of the present technology (referring to friction stability, the same hereinafter), being able to increase the content of the carbon blacks without excessively increasing viscosity of the composition, and excellence in imparting elongation at break and tensile elastic modulus to the cured product.

The DBP oil absorption of the first carbon black is preferably from 28 to 40 $cm^3/100$ g and more preferably from 28 to 32 $cm^3/100$ g in achieving superior effect of the present technology and excellent balance between shape-retention capability and fluidity of the mixture composition.

In the present technology, the dibutyl phthalate oil absorption of the carbon black was measured in accordance with JIS (Japanese Industrial Standard) K 6217-4:2008, "Carbon black for rubber industry—Fundamental characteristics—Part 4: Determination of oil absorption number".

The first carbon black includes, for example, an FT (Fine Thermal) class carbon black.

Commercially available products which can be used as the first carbon black includes, for example, Niteron #20 (manufactured by NSCC Carbon Co., Ltd., DBP oil absorption: 29 $cm^3/100$ g) and Asahi Thermal (manufactured by Asahi Carbon Co., Ltd., DBP oil absorption: 28 $cm^3/100$ g).

The first carbon black each can be used alone or in combination of two or more types thereof.

Second Carbon Black

In the present technology, the second carbon black has dibutyl phthalate oil absorption of from 85 to 120 $cm^3/100$ g.

The DBP oil absorption of the second carbon black is preferably from 95 to 120 $cm^3/100$ g and more preferably from 98 to 115 $cm^3/100$ g in achieving superior effect of the present technology and excellence in imparting flow resistance (negligible or very little flow of the composition) to the composition.

The DBP oil absorption of the second carbon black is preferably from 85 to 115 $cm^3/100$ g, and more preferably from 90 to 115 $cm^3/100$ g in achieving superior effect of the present technology and excellent shape-retention capability.

The second carbon black includes, for example, HAF (High Abrasion Furnace) class and ISAF (Intermediate Super Abrasion Furnace) class carbon black.

Commercially available products which can be used as the second carbon black includes, for example, Niteron #200 (DBP oil absorption: 101 $cm^3/100$ g) and Niteron #300 (DBP oil absorption: 115 $cm^3/100$ g)(both manufactured by NSCC Carbon Co., Ltd.).

The second carbon black each can be used alone or in combination of two or more types thereof.

In the present technology, the content 1 of the first carbon black is not less than 25 parts by mass per 100 parts by mass of the urethane prepolymer. The content 1 is preferably not greater than 140 parts by mass per 100 parts by mass of the urethane prepolymer in achieving superior effect of the present technology and excellent fluidity in tubing systems.

The content 1 is preferably not less than 45 parts by mass, more preferably from 60 to 130 parts by mass, and even more preferably from 75 to 100 parts by mass, per 100 parts by mass of the urethane prepolymer, in achieving superior effect of the present technology. The content 1 in this case may be referred to as content 1-1.

The content 1 is preferably from 25 to 95 parts by mass and more preferably from 35 to 65 parts by mass, per 100 parts by mass of the urethane prepolymer, in achieving superior effect of the present technology and excellent balance between shape-retention capability and fluidity of the mixture composition. The content 1 in this case may be referred to as content 1-2.

The content 2 of the second carbon black is preferably not less than 9 parts by mass per 100 parts by mass of the urethane prepolymer. The content 2 is preferably not greater than 45 parts by mass per 100 parts by mass of the urethane prepolymer in achieving superior effect of the present technology and excellent fluidity.

The content 2 is preferably from 10 to 30 parts by mass and more preferably from 15 to 25 parts by mass, per 100 parts by mass of the urethane prepolymer, in achieving superior effect of the present technology and excellent flow resistance. The content 2 in this case may be referred to as content 2-1.

The content 2 is preferably from 15 to 45 parts by mass and more preferably from 20 to 40 parts by mass, per 100 parts by mass of the urethane prepolymer, in achieving superior effect of the present technology and excellent balance between fluidity and shape-retention capability. The content 2 in this case may be referred to as content 2-2.

The content 1 and the content 2 preferably satisfy the following relationships (a) and (b) in achieving superior friction stability, excellent flow resistance and tensile elastic modulus:

$$11 \times \text{content } 1 + 20 \times \text{content } 2 \geq 1080; \text{ and} \quad \text{Relationship (a)}$$

$$2 \times \text{content } 1 + 55 \times \text{content } 2 \geq 710. \quad \text{Relationship (b)}$$

Additionally, the content 1 and the content 2 preferably satisfy the following relationships (c) and (d) in being able to ensure low viscosity of the composition and hence its discharge performance:

$$1 \times \text{content } 1 + 35 \times \text{content } 2 \leq 1165; \text{ and} \quad \text{Relationship (c)}$$

$$21 \times \text{content } 1 + 19 \times \text{content } 2 \leq 2985. \quad \text{Relationship (d)}$$

The content 1 and the content 2 preferably satisfy the following relationships (e) and (f) in achieving superior friction stability and excellent balance between fluidity and shape-retention capability:

$$59 \times \text{content } 2 < -4 \times \text{content } 1 + 2694; \text{ and} \quad \text{Relationship (e)}$$

$$2 \times \text{content } 2 < -11 \times \text{content } 1 + 1004. \quad \text{Relationship (f)}$$

The content 1 and the content 2 preferably satisfy the following relationships (g) and (h) in achieving superior friction stability and excellent balance between fluidity and shape-retention capability:

$$16 \times \text{content } 2 > -1 \times \text{content } 1 + 376; \text{ and} \quad \text{Relationship (g)}$$

$$15 \times \text{content } 2 > -23 \times \text{content } 1 + 1235. \quad \text{Relationship (h)}$$

The content 1 and the content 2 preferably satisfy the all of the relationships (a) to (d) above or all of the relationships (e) to (h) above in achieving superior friction stability, excellent flow resistance and tensile elastic modulus, and being able to ensure low viscosity of the composition and hence its discharging performance.

If the dibutyl phthalate oil absorption of the first carbon black is from 23 to 33 cm$^3$/100 g and the dibutyl phthalate oil absorption of the second carbon black is from 95 to 120 cm$^3$/100 g, it is preferable that the content 1 be the content 1-1 above and the content 2 be the content 2-1 above, and it is more preferable that the content 1 and the content 2 satisfy all the relationships (a) to (d) in achieving superior friction stability, excellent flow resistance and tensile elastic modulus, and being able to ensure low viscosity of the composition and hence its discharge performance.

If the dibutyl phthalate oil absorption of the first carbon black is from 28 to 40 cm$^3$/100 g and the dibutyl phthalate oil absorption of the second carbon black is from 85 to 115 cm$^3$/100 g, it is preferable that the content 1 be the content 1-2 above and the content 2 be the content 2-2 above, and it is more preferable that the content 1 and the content 2 satisfy all the relationships (e) to (h) in achieving superior friction stability, excellent flow resistance and tensile elastic modulus, and being able to ensure low viscosity of the composition and hence its discharge performance.

Calcium Carbonate

The calcium carbonate contained in the composition of the present technology is not particularly limited. It includes, for example, heavy calcium carbonate, precipitated calcium carbonate (light calcium carbonate), and colloidal calcium carbonate.

The particle size at 50% in the cumulative distribution (D50) is preferably from 1 to 10 μm. In the present technology, D50 of the calcium carbonate was measured in accordance with JIS M 8511.

The calcium carbonate each can be used alone or in combination of two or more types thereof.

In the present technology, the content of the calcium carbonate is from 5 to 30 parts by mass per 100 parts by mass of the urethane prepolymer; and preferably from 6 to 20 parts by mass, and more preferably from 8 to 20 parts by mass, per 100 parts by mass of the urethane prepolymer, in achieving superior effect of the present technology and excellent deep curability.

In the present technology, the content of the calcium carbonate is from 5 to 50 parts by mass per 100 parts by mass of the sum of the content 1 (the content of the first carbon black) and the content 2 (the content of the second carbon black); and preferably from 10 to 30 parts by mass, and more preferably from 12 to 18 parts by mass, per 100 parts by mass of the sum of the content 1 and the content 2, in achieving superior effect of the present technology and excellent deep curability.

Aliphatic Isocyanate

The aliphatic isocyanate will be described below. The aliphatic isocyanate contained in the composition of the present technology is not particularly limited as long as it is an aliphatic hydrocarbon compound having at least one isocyanate group per molecule.

The adhesive composition of the present technology has excellent adhesion by containing an aliphatic isocyanate, e.g., resulting in that a layer of air is less likely to form between the adhesive and the adherend surface after curing.

The aliphatic hydrocarbon group contained in the aliphatic isocyanate is not particularly limited. The aliphatic hydrocarbon group above may be a straight-chain, branched-chain, or cyclic group, and a straight-chain is preferable. The aliphatic hydrocarbon group above may be saturated or unsaturated, and a saturated group is preferable.

The number of the isocyanate groups contained in each molecule of the aliphatic isocyanate is preferably two or more, and more preferably two or three in achieving excellent adhesion. The aliphatic isocyanate having two or more isocyanate groups per molecule may be referred to as an aliphatic polyisocyanate hereinafter.

The aliphatic isocyanates include aliphatic diisocyanates (including alicyclic diisocyanates), such as hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatemethyl)cyclohexane (H$_6$XDI), and dicyclohexylmethane diisocyanate (H$_{12}$MDI); and modified products of the aliphatic polyisocyanates.

The aliphatic isocyanate is preferably a modified product of the aliphatic polyisocyanate.

The modified product of the polyisocyanate is preferably a compound with tri- or higher functionality modified from an aliphatic diisocyanate in achieving superior effect of the present technology and excellent primer-less adhesion to a coated plate.

The compound with tri- or higher functionality modified from an aliphatic diisocyanate is preferably at least one type of aliphatic isocyanate-modified product a selected from the group consisting of reaction products of a polyol having tri- or higher functionality and an aliphatic diisocyanate, allophanates of aliphatic diisocyanate, isocyanurates (nurates) of aliphatic diisocyanate, and biurets of aliphatic diisocyanate.

The aliphatic polyisocyanate used in the aliphatic isocyanate-modified product a is not particularly limited as long as the aliphatic polyisocyanate is an aliphatic hydrocarbon compound having at least two isocyanate groups per molecule. They include, for example, those similar to those exemplified for the aliphatic diisocyantes. Among them, a linear aliphatic diisocyanate is preferable from the viewpoint of storage stability and adhesion, and HDI is more preferable.

The aliphatic isocyanate-modified product a is preferably a trifunctional compound A that is modified from hexamethylene diisocyanate (HDI).

The trifunctional compound A modified from hexamethylene diisocyanate includes, for example, a reaction product of trifunctional polyol and hexamethylene diisocyanate such as trimethylol propane (TMP) and glycerin; allophanate of hexamethylene diisocyanate, isocyanurate (nurate) of hexamethylene diisocyanate, and biuret of hexamethylene diisocyanate.

The reaction product of trifunctional polyol and hexamethylene diisocyanate includes, for example, a reaction product of TMP and HDI (e.g. compound represented by Formula (5) below) and a reaction product of glycerin and HDI (e.g. compound represented by Formula (6) below).

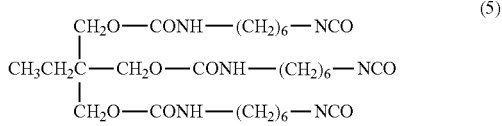

(5)

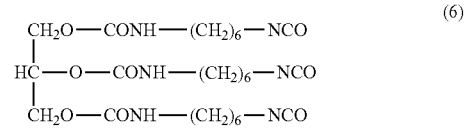

(6)

The allophanate of hexamethylene diisocyanate is not particularly limited. All isocyanates constituting the allophanate may be derived from hexamethylene diisocyanate. Alternatively, some isocyanates constituting the allophanate may be derived from an isocyanate compound different from hexamethylene diisocyanate. The isocyanate compound different from hexamethylene diisocyanate is not particularly limited.

The biuret of hexamethylene diisocyanate includes, for example, a compound represented by Formula (7) below.

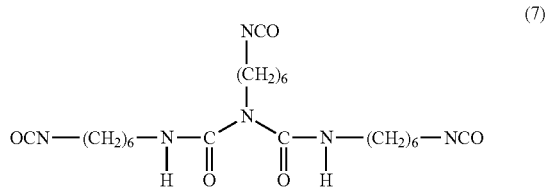

(7)

The isocyanurate (nurate) of hexamethylene diisocyante includes, for example, a compound represented by Formula (8) below.

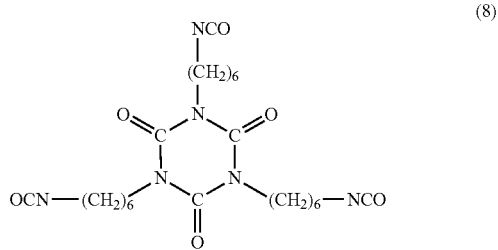

(8)

The aliphatic isocyanate is not particularly limited for its production. For example, it includes those conventionally well known. The aliphatic isocyanate each can be used alone or in combination of two or more types thereof.

The amount of the aliphatic isocyanate is preferably from 4 to 14 parts by mass and more preferably from 5 to 10 parts by mass, per 100 parts by mass of the urethane prepolymer, in achieving superior effects of the present technology and excellent primer-less adhesion to a coated plate.

Metal Catalyst

The metal catalyst contained in the composition of the present technology is not particularly limited as long as it can promote reaction of isocyanate groups. It includes, for example, an organometallic catalyst, a metal catalyst having no organic group and consisting solely of metal (also referred to as inorganic metal catalyst).

The metal contained in the metal catalyst includes, for example, tin, bismuth, and titanium.

Organic groups contained in the organometallic catalyst is not particularly limited. The organometallic catalysts include carboxylates of metals, alkoxydes of metals, and complexes of metals. The organometallic catalyst can contain at least one type selected from the group consisting of carboxylic acid, alkoxy groups, and ligands. The carboxylic acid, the alkoxy groups and the ligands are not particularly limited.

The metal catalyst preferably includes an organotin catalyst.

The organotin catalyst includes, for example, carboxylates of tin such as dioctyl tin dilaurate, dibutyl tin dilaurate, dibutyl tin maleate, tin (II) octoate, dibutyl tin diacetylacetonate, and dioctyl tin maleate; and a reaction product of 1,3-diacetoxy-1,1,3,3-tetrabutyl-distannoxane and ethyl silicate reacted at a molar ratio of from 1:0.8 to 1:1.2.

The organotitanium catalysts include, for example, tetrapropyl titanate, tetrabutyl titanate, tetraoctyl titanate, and diisopropoxy bis(ethylacetoacetate)titanium.

The metal catalysts are not particularly limited for their production. For example, they include those conventionally well known.

The metal catalyst each can be used alone or in combination of two or more types thereof.

The content of the metal catalyst is preferably from 0.0003 to 0.04 parts by mass, more preferably from 0.0004 to 0.03 parts by mass, and even more preferably from 0.005 to 0.02 parts by mass, per 100 parts by mass of the urethane prepolymer, in achieving superior effect of the present technology and excellent primer-less adhesion to a coated plate.

Amine Catalyst

The amine catalyst contained in the composition of the present technology is a compound which has a nitrogen atom and promotes reaction of isocyanate groups.

The amine catalyst preferably has a tertiary amino group (one nitrogen atom has single bonds to three carbon atoms, or one nitrogen atom has a single bond to one carbon atom and a double bond to another carbon atom).

The amine catalyst having a tertiary amino group (tertiary amine), include, for example, trimethylamine, triethylamine, tripropylamine, tributylamine, triamylamine, trihexylamine, trioctylamine, trilaurylamine, dimethylethylamine, dimethylpropylamine, dimethylbutylamine, dimethylamylamine, dimethylhexylamine, dimethylcyclohexylamine, dimethyloctylamine, dimethyllaurylamine, triallylamine, tetramethylethylenediamine, triethylenediamine, N-methylmorpholine, 4,4'-(oxydi-2,1-ethanediyl)bis-morpholine, N,N-dimethylbenzylamine, pyridine, picoline, dimethylaminomethylphenol, trisdimethylaminomethylphenol, 1,8-diazabicyclo[5.4.0]undecene-1,1,4-diazabicyclo[2.2.2]octane, triethanolamine, N,N"-dimethylpiperazine, tetramethyl butanediamine, bis(2,2-morpholinoethyl)ether, bis(dimethylaminoethyl)ether, and the like.

The amine catalyst preferably includes a dimorpholinodiethyl ether structure in achieving superior effect of the present technology and excellent moisture curing performance.

The dimorpholinodiethyl ether structure is a structure having a dimorpholinodiethyl ether as a basic backbone.

In the dimorpholinodiethyl ether structure, the hydrogen atom contained in the morpholine ring may be substituted with a substituent. The substituent is not particularly limited. It includes, for example, an alkyl group. The alkyl group includes, for example, a methyl group and an ethyl group.

The amine catalyst having the dimorpholinodiethyl ether structure includes compounds represented by Formula (1) below.

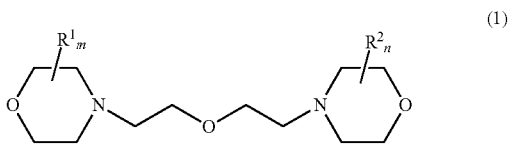

(1)

In Formula (1) above, $R^1$ and $R^2$ are each independently an alkyl group, and m and n are each independently 0, 1, or 2.

The amine catalyst having a dimorpholinodiethyl ether structure includes, specifically, for example, dimorpholinodiethyl ether, di(methylmorpholino)diethyl ether, and di(dimethylmorpholino)diethyl ether.

The single amine catalyst each can be used alone or in combination of two or more types thereof.

The content of the amine catalyst is preferably from 0.01 to 0.5 parts by mass, more preferably from 0.02 to 0.4 parts by mass, and even more preferably from 0.08 to 0.2 parts by mass, per 100 parts by mass of the urethane prepolymer, in achieving superior effect of the present technology and excellent moisture curing performance.

Optional Component

Third Carbon Black

The composition of the present technology can contain a third carbon black in achieving superior effect of the present technology, and excellent flow resistance and curing properties.

In the present technology, the third carbon black means a carbon black that has different dibutyl phthalate oil absorption from those of the first carbon and the second carbon black.

The dibutyl phthalate oil absorption of the third carbon black is not particularly limited as long as it is out of the ranges of dibutyl phthalate oil absorptions of the first carbon black and the second carbon black.

The dibutyl phthalate oil absorption of the third carbon black is preferably greater than 40 cm$^3$/100 g and less than 85 cm$^3$/100 g, or greater than 120 cm$^3$/100 g and less than 140 cm$^3$/100 g.

The type of the third carbon black is not particularly limited. It includes, for example, FEF (Fast Extruding Furnace), HAF (High Abrasion Furnace), and MT (Medium Thermal).

Commercially available products which can be used as the third carbon black include, for example, #60HN (manufactured by Asahi Carbon Co., Ltd., DBP oil absorption: 130 cm$^3$/100 g) and Niteron #300IN (manufactured by NSCC Carbon Co., Ltd., DBP oil absorption: 126 cm$^3$/100 g),

70L (manufactured by Asahi Carbon Co., Ltd., DBP oil absorption: 75 cm$^3$/100 g), Niteron 200L (manufactured by NSCC Carbon Co., Ltd., DBP oil absorption: 75 cm$^3$/100 g), and #50HG (manufactured by Asahi Carbon Co., Ltd., DBP oil absorption: 42 cm$^3$/100 g).

The third carbon black each can be used alone or in combination of two or more types thereof.

If the third carbon black is further used, dibutyl phthalate oil absorption of the third carbon black is k cm$^3$/100 g, and the content of the third carbon black is w parts by mass per 100 parts by mass of the urethane prepolymer, the value of k×w (the product of k and w) is preferably not less than 0 and not greater than 650, and more preferably not greater than 500.

When plural types of carbon blacks are used as the third carbon black, the k×w above is a sum of the k×w of all third carbon blacks.

Additives

The adhesive composition of the present technology may contain, if necessary, additives, in a range that does not inhibit the object of the present technology, such as fillers other than carbon black and calcium carbonate, isocyanate compounds other than aliphatic isocyanates, catalysts other than metal catalyst and amine catalyst, plasticizers, anti-sagging agents, anti-aging agents, antioxidants, pigments (dyes), thixotropic agents, ultraviolet absorbents, flame retardants, surfactants (including leveling agents), dispersing agents, dehydrating agents, adhesion promoters, and anti-static agents.

Among them, a preferable aspect includes the composition of the present technology further containing a plasticizer.

The plasticizer includes, for example, diisononyl phthalate (DINP); dioctyl adipate and isodecyl succinate; diethylene glycol dibenzoate and pentaerythritol esters; butyl oleate and methyl acetyl ricinoleate; tricresyl phosphate and trioctyl phosphate; propylene glycol adipate polyesters and butylene glycol adipate polyesters; and the like.

The plasticizer can be used alone or in combination of two or more types thereof.

The content of the plasticizer is preferably from 5 to 35 mass % based on the total mass of the composition.

The composition of the present technology is not particularly limited for its method of producing. For example, the composition of the present technology can be produced by stirring and mixing the urethane prepolymer, the carbon black, the calcium carbonate, the aliphatic isocyanate, the metal catalyst, the amine catalyst, and an optional component that can be used if necessary, under the condition of room temperature or heating (from 40 to 60° C., e.g. 40° C.), using a roll mill, a kneader, an extruder, or a universal agitator.

The composition of the present technology is one-part type.

The composition of the present technology can be cured by moisture. For example, the composition can be cured by moisture in the air under conditions of −20 to +50° C.

The pump used for transporting the composition of the present technology is not particularly limited. It includes, for example, an internal gear pump, in which an external gear and an internal gear engage each other and rotate. A commercially available pump product includes, for example, Trochoid (trademark) pump (manufactured by Nippon Oil Pump Co., Ltd.).

The use of the composition of the present technology includes an adhesive agent.

The adherend to which the composition of the present technology can be applied is not particularly limited. They include, for example, metal (including coated plates), plastic, rubber, and glass.

The composition of the present technology can be applied to the adherend without using a primer on the adherend. An adherend that does not use a primer includes, for example, a coated plate.

The coated plate is not particularly limited. It includes, for example, those conventionally well known. Painting used in the coated plate is not particularly limited.

When the composition of the present technology is used in direct glazing for bonding a window glass and a body (a coated plate), the composition of the present technology can be applied directly to the body without using a primer. A primer can be used on the glass side. The primer used on the adherend is not particularly limited.

EXAMPLES

The present technology is described below in detail using examples but the present technology is not limited thereto.

Production of Composition

The components shown in each Table below were used in compositions (part by mass) shown in the respective Table and mixed by an agitator to produce a composition.

Evaluation

The following evaluations were performed using the compositions produced as described above. Evaluation results of friction stability are shown in Table 1. All evaluation results are shown in Table 2 and Table 3.

Friction Stability

Figure 2:
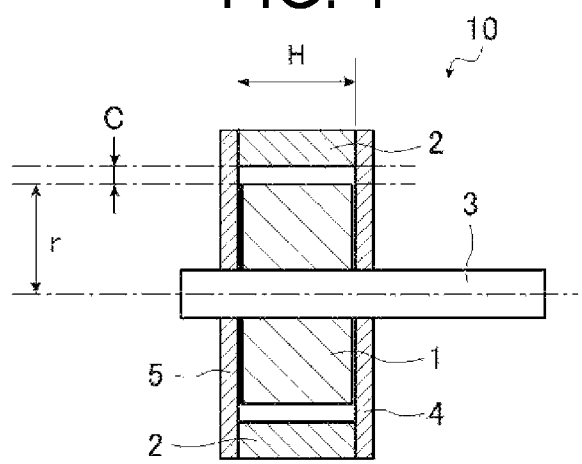
FIG. 2 is a cross-sectional view taken along A-A of FIG. 1.

Friction stability was evaluated using an instrument illustrated in FIG. 1 and FIG. 2.

FIG. 1 is a schematic plan view of the interior of the instrument used for evaluation of friction stability in shear mode in Examples of the present technology.

As illustrated in FIG. 1, the instrument 10 used for evaluation of friction stability in shear mode (the instrument 10 hereinafter) has a ring 1 inside the inner space of the outer frame 2. The clearance C between the outer frame 2 and the ring 1 is 0.1 mm. The radius r of the ring 1 is 50 mm. The ring 1 has an axis 3. Note that the upper lid is removed from the instrument 10 in FIG. 1.

FIG. 2 is a cross-sectional view taken along A-A of FIG. 1. In FIG. 2, the upper lid 4 is attached to the instrument 10.

In FIG. 2, the instrument 10 has the upper lid 4 and the lower lid 5 above and below the outer frame 2, respectively. The instrument 10 is sealed by these lids.

The upper lid 4 has a material loading inlet leading to the inner space of the outer frame 2 from the exterior of the instrument 10.

The lower lid 5 has a material discharge port leading to the exterior of the instrument 10 from the inner space of the outer frame 2.

The inner space of the outer frame 2 has a height H of 20 mm. The height of the ring 1 is 19.9 mm.

The evaluation of friction stability was performed as follows. First, the composition produced as described above was loaded from the material loading inlet of the upper lid 4. The material discharge port of the lower lid 5 was closed after the composition was discharged from the material discharge port of the lower lid 5. The composition was loaded into the inner space of the outer frame 2 until the inner pressure of the outer frame 2 reached 8 MPa. Then, the material loading inlet of the upper lid 4 was closed.

Next, the axis 3 and the ring 1 were rotated for 4 hours in the direction of the arrow indicated in FIG. 1 at a rate of 500 rotations per minute under the condition of 50° C., while the inner space of the outer frame 2 was in a state of fully loaded with the composition.

After four hours, the upper lid 4 was removed from the outer frame 2 and the presence/absence of the cured product inside the inner space of the outer frame 2 was visually observed. Additionally, the temperature of the inner space of the outer frame 2 was measured by the temperature sensor.

If the cured product was not present in the inner space of the outer frame 2, the friction stability was rated as quite excellent and indicated as "Excel".

If the cured product was present in the inner space of the outer frame 2 but the ring 1 continued to rotate until the end of the test and the temperature of the outer frame 2 was not greater than 70° C., the friction stability was rated as excellent and indicated as "Fair".

If the cured product was present in the inner space of the outer frame 2 and the ring 1 stopped rotating during the test or the temperature of the outer frame 2 exceeded 70° C., the friction stability was rated as poor and indicated as "Poor".

SOD Viscosity

The SOD viscosity (initial viscosity) of the composition produced as described above was measured using a pressure viscometer (ASTM D 1092) in accordance with JASO M338-89.

Viscosity Stability

The compositions produced as described above was placed in a container, sealed, and stored for 7 days at 40° C. Thereafter, SOD viscosity (Pa·s) was measured, and the rate of the viscosity increase from the SOD viscosity prior to the storage (initial viscosity) was calculated. The rate of the viscosity increase is referred to as storage viscosity increase percentage.

The SOD viscosity was measured using a pressure viscometer (ASTM D 1092) in accordance with JASO M338-89.

If the storage viscosity increase percentage is not greater than 30%, then the viscosity stability (storage stability) is rated excellent.

TFT (Tack-Free Time)

The composition produced as described above was placed under the conditions of 23° C., 50% RH (relative humidity), then the stickiness of the surface of the composition (cured product) was checked by touching with fingertips to measure the time (min) from the onset of the curing to the loss of stickiness.

Flow Resistance

Each composition produced as described above was extruded onto a glass plate in a band-like shape (length 15 cm) using a right-triangle bead (base length 6 mm, height 10 mm). Then, the glass plate was positioned vertically (at an angle of 90°) and fixed so that the plane that included the 10-mm height side of the band-like composition above was horizontal and positioned at the upper side of the composition. The glass plate was held in the horizontal position for 30 minutes under the conditions of 20° C., 65% RH.

The distance h (mm) of sagging of the apex of the right triangle of each composition at 30 minutes after the glass plate was positioned vertically was measured and the value was used for evaluation of flow resistance.

Curing Rate at Deep Portion (Deep Curability)

A polyethylene frame (length 5 cm×width 5 cm×height 5 cm) was provided. Each composition produced as described above was poured into the frame to the height of the frame, while preventing air bubbles from being trapped therein. The upper surface of the composition which was in contact with air was flattened, and this composition was used as the test sample. The test sample was immediately placed in the conditions of 23° C., 50% relative humidity, and the time at this point was defined as the start time for measuring the curing time.

After 6 hours from the start time above, the test sample was cut perpendicular to the upper surface of the composition, which was in contact with air (the surface facing the air), and the uncured composition (adhesive) was removed. The thickness of the resulting cured product was measured from the surface above (unit: mm).

Tensile Elastic Modulus

Preparation of Samples

Each composition produced as described above was cured in the conditions of 20° C., 65% RH for 336 hours and a sample of 3 mm thickness was cut out in a shape of dumbbell No. 3 from the resulting cured product.

Measurement of Tensile Elastic Modulus

Using the sample prepared as described above, the tensile elastic modulus (unit: MPa) was measured in accordance with JIS K 6251, under the conditions of 23° C. and at a tensile test speed of 500 mm/min. The tensile elastic modulus was calculated from two points of stress, 10 N and 20 N. If the tensile elastic modulus is from 8 to 14 MPa, the resulting cured product can be rated as having a high hardness, i.e. a high rigidity.

Initial Adhesion Expression Properties

Preparation of Samples for Initial Adhesion Evaluation

A piece of a glass plate (length 25 mm×width 100 mm×thickness 0.8 mm, processed with a primer manufactured by Yokohama Rubber Co., Ltd. under the trade name of MS-90) was provided as an adherend. Each of the compositions was coated on the glass plate under room temperature. A coated plate NP (trade name O-1810, manufactured by Nippon Paint Co. Ltd., with no primer) was stacked on the glass plate and both adherends were subjected to compression bonding. The length of the bond portion of the coated plate NP and the glass plate (where the coated plate NP and the glass plate overlapped) was 10 mm. The thickness of the composition at the bond portion was 3 mm. After the compression bonding, this sample was placed under the conditions of 20° C., 65% RH for 7 days to prepare the initial adhesion evaluation sample.

Hand Peeling Test

Using the initial adhesion evaluation sample prepared as described above, hand peel test using a cutter knife was performed.

If cohesive failure occurred in the entire adhesive layer as a result of hand peel test, the result was indicated as "CF". In this case, the sample has quite excellent expression of initial adhesion.

If interfacial failure was observed, it was evaluated as poor in expression of initial adhesion, and indicated as "Poor".

Accelerated Cure Adhesion

Each composition prepared as described above was coated onto an adherend (a glass plate coated with a primer (MS-90, manufactured by Yokohama Rubber Co., Ltd.)) and placed under the conditions of 20° C., 65% RH for 3 hours after coating, followed by under the conditions of 40° C., 95% RH for 24 hours to prepare the accelerated cure adhesion evaluation sample.

Using the accelerated cure adhesion evaluation sample obtained as described above, a similar hand peel test as described above was performed to evaluate the sample.

Accelerated Weathering Adhesion

Using the initial adhesion evaluation sample, accelerated weathering test was performed for 2000 hours using a sunshine weather meter, and subsequently a similar hand peel test as described above was performed to evaluate the sample.

TABLE 1

| | | | Comparative Examples | | | | | |
|---|---|---|---|---|---|---|---|---|
| | | | 1 | 2 | 3 | 4 | 5 | 6 |
| Urethane prepolymer 1 | | | 100 | 100 | 100 | 100 | 100 | 100 |
| Carbon black | E (oil absorption number = 130) (For comparison) | | | | | | | |
| | C (oil absorption number = 126) (For comparison) | | | | | | | |
| | A (oil absorption number = 115) (Second carbon black) | | 40 | 8 | 8 | 20 | 16 | 10 |
| | B (oil absorption number = 101) (Second carbon black) | | | | | | | |
| | D (oil absorption number = 75) (For comparison) | | | | | | | |
| | H (oil absorption number = 42) (For comparison) | | | | | | | |
| | F (oil absorption number = 29) (First carbon black) | | 0 | 85 | 75 | 95 | 60 | 46 |
| | G (oil absorption number = 28) (First carbon black) | | 0 | | | | | |
| | Parts by mass content of calcium carbonate per 100 parts by mass of (CB1 + CB2) | | 75 | 19.4 | 21.7 | 30.4 | 52.6 | 51.8 |
| Aliphatic isocyanate | HDI-biuret | | 8 | 7 | 7 | 7 | 7 | 7 |
| | HDI-isocyanurate | | | | | | | |
| | HDI-TMP modified product | | | | | | | |
| Calcium carbonate | A (D50 = 8.5 μm) | | 30 | 18 | 18 | 35 | 40 | 29 |
| | B (D50 = 2.2 μm) | | | | | | | |
| Metal catalyst | Sn catalyst (U810) | | 0.01 | 0.01 | 0.01 | 0.01 | 0.01 | 0.01 |
| | Bi catalyst (U600) | | | | | | | |
| | Ti catalyst (TC-750) | | | | | | | |
| Amine catalyst | DMDEE | | 0.1 | 0.1 | 0.1 | 0.1 | 0.1 | 0.1 |
| | DMMDEE | | | | | | | |
| | TEDA | | | | | | | |
| Properties of uncured material | Friction stability | | Poor | Poor | Poor | Poor | Poor | Poor |

TABLE 2-1

|  |  | Examples | | | | | | |
| --- | --- | --- | --- | --- | --- | --- | --- | --- |
|  |  | 1 | 2 | 3 | 4 | 5 | 6 | 7 |
| Urethane prepolymer 1 |  | 100 | 100 | 100 | 100 | 100 | 100 | 100 |
| Carbon black | E (oil absorption number = 130) (Third carbon black) |  |  |  |  |  |  |  |
|  | C (oil absorption number = 126) (Third carbon black) |  |  |  |  |  |  |  |
|  | A (oil absorption number = 115) (Second carbon black) | 20 | 30 | 20 | 10 | 10 | 10 | 20 |
|  | B (oil absorption number = 101) (Second carbon black) |  |  |  |  |  |  |  |
|  | D (oil absorption number = 75) (Third carbon black) |  |  |  |  |  |  |  |
|  | H (oil absorption number = 42) (Third carbon black) |  |  |  |  |  |  |  |
|  | F (oil absorption number = 29) (First carbon black) | 95 | 45 | 65 | 80 | 100 | 130 | 120 |
|  | G (oil absorption number = 28) (First carbon black) |  |  |  |  |  |  |  |
|  | Parts by mass content of calcium carbonate per 100 parts by mass of (CB1 + CB2) | 15.7 | 24.0 | 21.2 | 20.0 | 16.4 | 12.9 | 12.9 |
|  | Relationship (a): 11 × content 1 + 20 × content 2 (≥1080) | 1445 | 1095 | 1115 | 1080 | 1300 | 1630 | 1720 |
|  | Relationship (b): 2 × content 1 + 55 × content 2 (≥710) | 1290 | 1740 | 1230 | 710 | 750 | 810 | 1340 |
|  | Relationship (c): 1 × content 1 + 35 × content 2 (≤1165) | 795 | 1095 | 765 | 430 | 450 | 480 | 820 |
|  | Relationship (d): 21 × content 1 + 19 × content 2 (≤2985) | 2375 | 1515 | 1745 | 1870 | 2290 | 2920 | 2900 |
|  | kw of the third carbon black |  |  |  |  |  |  |  |
| Aliphatic isocyanate | HDI |  |  |  |  |  |  |  |
|  | HDI-biuret | 7 | 7 | 7 | 7 | 7 | 7 | 7 |
|  | HDI-isocyanurate |  |  |  |  |  |  |  |
|  | HDI-TMP modified product |  |  |  |  |  |  |  |
| Calcium carbonate | A (D50 = 8.5 μm) | 18 | 18 | 18 | 18 | 18 | 18 | 18 |
|  | B (D50 = 2.2 μm) |  |  |  |  |  |  |  |
| Metal catalyst | Sn catalyst (U810) | 0.01 | 0.01 | 0.01 | 0.01 | 0.01 | 0.01 | 0.01 |
|  | Bi catalyst (U600) |  |  |  |  |  |  |  |
|  | Ti catalyst (TC-750) |  |  |  |  |  |  |  |
| Amine catalyst | DMDEE | 0.1 | 0.1 | 0.1 | 0.1 | 0.1 | 0.1 | 0.1 |
|  | DMMDEE |  |  |  |  |  |  |  |
|  | TEDA |  |  |  |  |  |  |  |
| Properties of uncured material | Friction stability | Excel | Excel | Excel | Excel | Excel | Excel | Excel |
|  | SOD viscosity (Pa · s) | 73 | 84 | 53 | 54 | 75 | 81 | 84 |
|  | Viscosity stability (storage viscosity increase percentage) | 15 | 18 | 18 | 18 | 20 | 20 | 15 |
|  | TFT(min) | 39 | 38 | 39 | 40 | 39 | 39 | 37 |
|  | Flow resistance | 0 | 0 | 1 | 1 | 1 | 1 | 0 |
|  | Curing rate at deep portion | 1.8 | 1.7 | 1.7 | 2.7 | 1.7 | 1.6 | 1.7 |
| Curing properties, Adhesion properties | Tensile elastic modulus (MPa) | 11.6 | 9.5 | 8.3 | 8.9 | 10.3 | 10.8 | 10.9 |
|  | Initial adhesion expression properties | CF | CF | CF | CF | CF | CF | CF |
|  | Accelerated cure adhesion | CF | CF | CF | CF | CF | CF | CF |
|  | Accelerated weathering adhesion | CF | CF | CF | CF | CF | CF | CF |

TABLE 2-2

|  |  | Examples | | | | | |
| --- | --- | --- | --- | --- | --- | --- | --- |
|  |  | 8 | 9 | 10 | 11 | 12 | 13 |
| Urethane prepolymer 1 |  | 100 | 100 | 100 | 100 | 100 | 100 |
| Carbon black | E (oil absorption number = 130) (Third carbon black) |  |  |  |  |  |  |
|  | C (oil absorption number = 126) (Third carbon black) |  |  |  |  |  |  |
|  | A (oil absorption number = 115) (Second carbon black) | 28 | 30 |  | 20 | 20 | 20 |
|  | B (oil absorption number = 101) (Second carbon black) |  |  | 20 |  |  |  |
|  | D (oil absorption number = 75) (Third carbon black) |  |  |  |  |  |  |

TABLE 2-2-continued

|  |  | Examples | | | | | |
|---|---|---|---|---|---|---|---|
|  |  | 8 | 9 | 10 | 11 | 12 | 13 |
|  | H (oil absorption number = 42) (Third carbon black) |  |  |  |  |  |  |
|  | F (oil absorption number = 29) (First carbon black) | 115 | 80 | 95 |  | 95 | 95 |
|  | G (oil absorption number = 28) (First carbon black) |  |  |  | 95 |  |  |
|  | Parts by mass content of calcium carbonate per 100 parts by mass of (CB1 + CB2) | 12.6 | 16.4 | 15.7 | 15.7 | 15.7 | 15.7 |
|  | Relationship (a): 11 × content 1 + 20 × content 2 (≥1080) | 1825 | 1480 | 1445 | 1445 | 1445 | 1445 |
|  | Relationship (b): 2 × content 1 + 55 × content 2 (≥710) | 1770 | 1810 | 1290 | 1290 | 1290 | 1290 |
|  | Relationship (c) 1 × content 1 + 35 × content 2 (≤1165) | 1095 | 1130 | 795 | 795 | 795 | 795 |
|  | Relationship (d): 21 × content 1 + 19 × content 2 (≤2985) | 2947 | 2250 | 2375 | 2375 | 2375 | 2375 |
|  | kw of the third carbon black |  |  |  |  |  |  |
| Aliphatic isocyanate | HDI |  |  |  |  |  |  |
|  | HDI-biuret | 7 | 7 | 7 | 7 |  |  |
|  | HDI-isocyanurate |  |  |  |  | 7 |  |
|  | HDI-TMP modified product |  |  |  |  |  | 7 |
| Calcium carbonate | A (D50 = 8.5 μm) | 18 | 18 | 18 | 18 | 18 | 18 |
|  | B (D50 = 2.2 μm) |  |  |  |  |  |  |
| Metal catalyst | Sn catalyst (U810) | 0.01 | 0.01 | 0.01 | 0.01 | 0.01 | 0.01 |
|  | Bi catalyst (U600) |  |  |  |  |  |  |
|  | Ti catalyst (TC-750) |  |  |  |  |  |  |
| Amine catalyst | DMDEE | 0.1 | 0.1 | 0.1 | 0.1 | 0.1 | 0.1 |
|  | DMMDEE |  |  |  |  |  |  |
|  | TEDA |  |  |  |  |  |  |
| Properties of uncured material | Friction stability | Excel | Excel | Excel | Excel | Excel | Excel |
|  | SOD viscosity (Pa · s) | 84 | 85 | 70 | 70 | 71 | 73 |
|  | Viscosity stability (storage viscosity increase percentage) | 16 | 17 | 15 | 15 | 16 | 16 |
|  | TFT(min) | 38 | 38 | 38 | 38 | 38 | 38 |
|  | Flow resistance | 0 | 0 | 0 | 0 | 0 | 0 |
|  | Curing rate at deep portion | 1.8 | 1.8 | 1.8 | 1.8 | 1.8 | 1.8 |
| Curing properties, Adhesion properties | Tensile elastic modulus (MPa) | 12.3 | 11.1 | 11.5 | 11.5 | 11.9 | 9.9 |
|  | Initial adhesion expression properties | CF | CF | CF | CF | CF | CF |
|  | Accelerated cure adhesion | CF | CF | CF | CF | CF | CF |
|  | Accelerated weathering adhesion | CF | CF | CF | CF | CF | CF |

TABLE 2-3

|  |  | Examples | | | | | |
|---|---|---|---|---|---|---|---|
|  |  | 14 | 15 | 16 | 17 | 18 | 19 |
| Urethane prepolymer 1 |  | 100 | 100 | 100 | 100 | 100 | 100 |
| Carbon black | E (oil absorption number = 130) (Third carbon black) |  |  |  |  |  |  |
|  | C (oil absorption number = 126) (Third carbon black) |  |  |  |  |  |  |
|  | A (oil absorption number = 115) (Second carbon black) | 20 | 20 | 20 | 20 | 20 | 20 |
|  | B (oil absorption number = 101) (Second carbon black) |  |  |  |  |  |  |
|  | D (oil absorption number = 75) (Third carbon black) |  |  |  |  |  |  |
|  | H (oil absorption number = 42) (Third carbon black) |  |  |  |  |  |  |
|  | F (oil absorption number = 29) (First carbon black) | 95 | 95 | 95 | 95 | 95 | 95 |
|  | G (oil absorption number = 28) (First carbon black) |  |  |  |  |  |  |
|  | Parts by mass content of calcium carbonate per 100 parts by mass of (CB1 + CB2) | 15.7 | 15.7 | 15.7 | 15.7 | 15.7 | 15.7 |

TABLE 2-3-continued

|  |  | Examples | | | | | |
| --- | --- | --- | --- | --- | --- | --- | --- |
|  |  | 14 | 15 | 16 | 17 | 18 | 19 |
|  | Relationship (a): 11 × content 1 + 20 × content 2 (≥1080) | 1445 | 1445 | 1445 | 1445 | 1445 | 1445 |
|  | Relationship (b): 2 × content 1 + 55 × content 2 (≥710) | 1290 | 1290 | 1290 | 1290 | 1290 | 1290 |
|  | Relationship (c) 1 × content 1 + 35 × content 2 (≤1165) | 795 | 795 | 795 | 795 | 795 | 795 |
|  | Relationship (d): 21 × content 1 + 19 × content 2 (≤2985) | 2375 | 2375 | 2375 | 2375 | 2375 | 2375 |
|  | kw of the third carbon black |  |  |  |  |  |  |
| Aliphatic isocyanate | HDI |  |  |  |  |  |  |
|  | HDI-biuret | 4 | 14 |  |  |  |  |
|  | HDI-isocyanurate |  |  | 5 | 14 |  |  |
|  | HDI-TMP modified product |  |  |  |  | 5 | 14 |
| Calcium carbonate | A (D50 = 8.5 μm) | 18 | 18 | 18 | 18 | 18 | 18 |
|  | B (D50 = 2.2 μm) |  |  |  |  |  |  |
| Metal catalyst | Sn catalyst (U810) | 0.01 | 0.01 | 0.01 | 0.01 | 0.01 | 0.01 |
|  | Bi catalyst (U600) |  |  |  |  |  |  |
|  | Ti catalyst (TC-750) |  |  |  |  |  |  |
| Amine catalyst | DMDEE | 0.1 | 0.1 | 0.1 | 0.1 | 0.1 | 0.1 |
|  | DMMDEE |  |  |  |  |  |  |
|  | TEDA |  |  |  |  |  |  |
| Properties of uncured material | Friction stability | Excel | Excel | Excel | Excel | Excel | Excel |
|  | SOD viscosity (Pa · s) | 71 | 75 | 71 | 73 | 70 | 76 |
|  | Viscosity stability (storage viscosity increase percentage) | 16 | 19 | 16 | 18 | 16 | 19 |
|  | TFT(min) | 38 | 40 | 38 | 39 | 38 | 41 |
|  | Flow resistance | 0 | 0 | 0 | 0 | 0 | 0 |
|  | Curing rate at deep portion | 1.8 | 1.7 | 1.8 | 1.7 | 1.8 | 1.7 |
| Curing properties, | Tensile elastic modulus (MPa) | 8.2 | 13.8 | 8.3 | 13.9 | 8.1 | 13.4 |
| Adhesion properties | Initial adhesion expression properties | CF | CF | CF | CF | CF | CF |
|  | Accelerated cure adhesion | CF | CF | CF | CF | CF | CF |
|  | Accelerated weathering adhesion | CF | CF | CF | CF | CF | CF |

TABLE 2-4

|  |  | Examples | | | | | |
| --- | --- | --- | --- | --- | --- | --- | --- |
|  |  | 20 | 21 | 22 | 23 | 24 | 25 |
| Urethane prepolymer 1 |  | 100 | 100 | 100 | 100 | 100 | 100 |
| Carbon black | E (oil absorption number = 130) (Third carbon black) |  |  |  |  | 3 |  |
|  | C (oil absorption number = 126) (Third carbon black) |  |  | 3 |  |  |  |
|  | A (oil absorption number = 115) (Second carbon black) | 20 | 20 | 20 | 20 | 20 | 20 |
|  | B (oil absorption number = 101) (Second carbon black) |  |  |  |  |  |  |
|  | D (oil absorption number = 75) (Third carbon black) |  |  |  | 6 |  |  |
|  | H (oil absorption number = 42) (Third carbon black) |  |  |  |  |  | 10 |
|  | F (oil absorption number = 29) (First carbon black) | 95 | 95 | 95 | 95 | 95 | 95 |
|  | G (oil absorption number = 28) (First carbon black) |  |  |  |  |  |  |
|  | Parts by mass content of calcium carbonate per 100 parts by mass of (CB1 + CB2) | 15.7 | 15.7 | 15.3 | 14.9 | 15.3 | 14.4 |
|  | Relationship (a): 11 × content 1 + 20 × content 2 (≥1080) | 1445 | 1445 | 1445 | 1445 | 1445 | 1445 |

TABLE 2-4-continued

|  |  | Examples | | | | | |
|---|---|---|---|---|---|---|---|
|  |  | 20 | 21 | 22 | 23 | 24 | 25 |
|  | Relationship (b): 2 × content 1 + 55 × content 2 (≥ 710) | 1290 | 1290 | 1290 | 1290 | 1290 | 1290 |
|  | Relationship (c) 1 × content 1 + 35 × content 2 (≤1165) | 795 | 795 | 795 | 795 | 795 | 795 |
|  | Relationship (d): 21 × content 1 + 19 × content 2 (≤2985) | 2375 | 2375 | 2375 | 2375 | 2375 | 2375 |
|  | kw of the third carbon black |  |  |  |  |  |  |
| Aliphatic isocyanate | HDI |  |  |  |  |  |  |
|  | HDI-biuret | 7 | 7 | 7 | 7 | 7 | 7 |
|  | HDI-isocyanurate |  |  |  |  |  |  |
|  | HDI-TMP modified product |  |  |  |  |  |  |
| Calcium carbonate | A (D50 = 8.5 μm) |  | 18 | 18 | 18 | 18 | 18 |
|  | B (D50 = 2.2 μm) | 18 |  |  |  |  |  |
| Metal catalyst | Sn catalyst (U810) | 0.01 | 0.01 | 0.01 | 0.01 | 0.01 | 0.01 |
|  | Bi catalyst (U600) |  |  |  |  |  |  |
|  | Ti catalyst (TC-750) |  |  |  |  |  |  |
| Amine catalyst | DMDEE | 0.1 |  | 0.1 | 0.1 | 0.1 | 0.1 |
|  | DMMDEE |  | 0.1 |  |  |  |  |
|  | TEDA |  |  |  |  |  |  |
| Properties of uncured material | Friction stability | Excel | Excel | Excel | Excel | Excel | Excel |
|  | SOD viscosity (Pa·s) | 72 | 72 | 79 | 81 | 80 | 80 |
|  | Viscosity stability (storage viscosity increase percentage) | 15 | 16 | 16 | 16 | 16 | 16 |
|  | TFT(min) | 38 | 41 | 39 | 42 | 40 | 39 |
|  | Flow resistance | 0 | 0 | 0 | 0 | 0 | 0 |
|  | Curing rate at deep portion | 1.8 | 1.8 | 1.8 | 1.8 | 1.8 | 1.8 |
| Curing properties, | Tensile elastic modulus (MPa) | 11.6 | 11.3 | 11.9 | 12.1 | 11.5 | 12.5 |
| Adhesion properties | Initial adhesion expression properties | CF | CF | CF | CF | CF | CF |
|  | Accelerated cure adhesion | CF | CF | CF | CF | CF | CF |
|  | Accelerated weathering adhesion | CF | CF | CF | CF | CF | CF |

TABLE 2-5

|  |  | Examples | | | | |
|---|---|---|---|---|---|---|
|  |  | 26 | 27 | 28 | 29 | 30 |
| Urethane prepolymer 1 |  | 100 | 100 | 100 | 100 | 100 |
| Carbon black | E (oil absorption number = 130) (Third carbon black) |  |  |  |  |  |
|  | C (oil absorption number = 126) (Third carbon black) |  |  |  |  |  |
|  | A (oil absorption number = 115) (Second carbon black) | 34 | 12 | 22 | 30 | 32 |
|  | B (oil absorption number = 101) (Second carbon black) |  |  |  |  |  |
|  | D (oil absorption number = 75) (Third carbon black) |  |  |  |  |  |
|  | H (oil absorption number = 42) (Third carbon black) |  |  |  |  |  |
|  | F (oil absorption number = 29) (First carbon black) | 45 | 70 | 125 | 120 | 115 |
|  | G (oil absorption number = 28) (First carbon black) |  |  |  |  |  |
|  | Parts by mass content of calcium carbonate per 100 parts by mass of (CB1 + CB2) | 23 | 22 | 12 | 12 | 12 |
|  | Relationship (a): 11 × content 1 + 20 × content 2 (≥1080) | 1175 | 1010 | 1815 | 1920 | 1905 |
|  | Relationship (b): 2 × content 1 + 55 × content 2 (≥710) | 1960 | 800 | 1460 | 1890 | 1990 |
|  | Relationship (c): 1 × content 1 + 35 × content 2 (≤1165) | 1235 | 490 | 895 | 1170 | 1235 |
|  | Relationship (d): 21 × content 1 + 19 × content 2 (≤2985) | 1591 | 1698 | 3043 | 3090 | 3023 |
|  | kw of the third carbon black |  |  |  |  |  |

TABLE 2-5-continued

|  |  | Examples | | | | |
| --- | --- | --- | --- | --- | --- | --- |
|  |  | 26 | 27 | 28 | 29 | 30 |
| Aliphatic isocyanate | HDI | | | | | |
|  | HDI-biuret | 7 | 7 | 7 | 7 | 7 |
|  | TDI-isocyanurate | | | | | |
|  | HDI-TMP modified product | | | | | |
| Calcium carbonate | A (D50 = 8.5 μm) | 18 | 18 | 18 | 18 | 18 |
|  | B (D50 = 2.2 μm) | | | | | |
| Metal catalyst | Sn catalyst (U810) | 0.01 | 0.01 | 0.01 | 0.01 | 0.01 |
|  | Bi catalyst (U600) | | | | | |
|  | Ti catalyst (TC-750) | | | | | |
| Amine catalyst | DMDEE | 0.1 | 0.1 | 0.1 | 0.1 | 0.1 |
|  | DMMDEE | | | | | |
|  | TEDA | | | | | |
| Properties of uncured material | Friction stability | Fair | Fair | Excel | Excel | Excel |
|  | SOD viscosity (Pa · s) | 103 | 57 | 100 | 108 | 114 |
|  | Viscosity stability (storage viscosity increase percentage) | 18 | 19 | 15 | 17 | 16 |
|  | TFT (min) | 38 | 39 | 37 | 38 | 38 |
|  | Flow resistance | 0 | 2 | 0 | 0 | 0 |
|  | Curing rate at deep portion | 1.7 | 1.6 | 1.7 | 1.6 | 1.8 |
| Curing properties, Adhesion properties | Tensile elastic modulus (MPa) | 9.2 | 8.2 | 11.1 | 12.4 | 12.5 |
|  | Initial adhesion expression properties | CF | CF | CF | CF | CF |
|  | Accelerated cure adhesion | CF | CF | CF | CF | CF |
|  | Accelerated weathering adhesion | CF | CF | CF | CF | CF |

TABLE 2-6

|  |  | Examples | | | |
| --- | --- | --- | --- | --- | --- |
|  |  | 31 | 32 | 33 | 34 |
| Carbon black | Urethane prepolymer 1 | 100 | 100 | 100 | 100 |
|  | E (oil absorption number = 130) (Third carbon black) | | | | |
|  | C (oil absorption number = 126) (Third carbon black) | | | | |
|  | A (oil absorption number = 115) (Second carbon black) | 32 | 20 | 20 | 20 |
|  | B (oil absorption number = 101) (Second carbon black) | | | | |
|  | D (oil absorption number = 75) (Third carbon black) | | | | |
|  | H (oil absorption number = 42) (Third carbon black) | | | | |
|  | F (oil absorption number = 29) (First carbon black) | 90 | 60 | 95 | 95 |
|  | G (oil absorption number = 28) (First carbon black) | | | | |
|  | Parts by mass content of calcium carbonate per 100 parts by mass of (CB1 + CB2) | 15 | 23 | 16 | 16 |
|  | Relationship (a): 11 × content 1 + 20 × content 2 (≥1080) | 1630 | 1060 | 1445 | 1445 |
|  | Relationship (b): 2 × content 1 + 55 × content 2 (≥710) | 1940 | 1220 | 1290 | 1290 |
|  | Relationship (c): 1 × content 1 + 35 × content 2 (≤1165) | 1210 | 760 | 795 | 795 |
|  | Relationship (d): 21 × content 1 + 19 × content 2 (≤2985) | 2498 | 1640 | 2375 | 2375 |
|  | kw of the third carbon black | | | | |
| Aliphatic isocyanate | HDI | | | 7 | |
|  | HDI-biuret | 7 | 7 | | 7 |
|  | TDI-isocyanurate | | | | |
|  | HDI-TMP modified product | | | | |
| Calcium carbonate | A (D50 = 8.5 μm) | 18 | 18 | 18 | 18 |
|  | B (D50 = 2.2 μm) | | | | |
| Metal catalyst | Sn catalyst (U810) | 0.01 | 0.01 | 0.01 | |
|  | Bi catalyst (U600) | | | | |
|  | Ti catalyst (TC-750) | | | | 0.01 |
| Amine catalyst | DMDEE | 0.1 | 0.1 | 0.1 | 0.1 |
|  | DMMDEE | | | | |
|  | TEDA | | | | |

TABLE 2-6-continued

|  |  | Examples | | | |
|---|---|---|---|---|---|
|  |  | 31 | 32 | 33 | 34 |
| Properties of uncured material | Friction stability | Excel | Fair | Excel | Excel |
|  | SOD viscosity (Pa · s) | 104 | 53 | 77 | 76 |
|  | Viscosity stability (storage viscosity increase percentage) | 16 | 18 | 14 | 12 |
|  | TFT (min) | 38 | 39 | 40 | 53 |
|  | Flow resistance | 0 | 2 | 0 | 0 |
|  | Curing rate at deep portion | 1.8 | 1.7 | 1.8 | 1.5 |
| Curing properties, Adhesion properties | Tensile elastic modulus (MPa) | 11.3 | 8.1 | 6.7 | 10.1 |
|  | Initial adhesion expression properties | CF | CF | CF | Poor |
|  | Accelerated cure adhesion | CF | CF | CF | Poor |
|  | Accelerated weathering adhesion | CF | CF | CF | Poor |

TABLE 2-7

|  |  | Examples | | | | |
|---|---|---|---|---|---|---|
|  |  | 35 | 36 | 37 | 38 | 39 |
| Urethane prepolymer 1 |  | 100 | 100 | 100 | 100 | 100 |
| Carbon black | E (oil absorption number = 130) (Third carbon black) |  |  |  |  |  |
|  | C (oil absorption number = 126) (Third carbon black) |  |  | 5 |  | 3 |
|  | A (oil absorption number = 115) (Second carbon black) | 20 | 20 | 20 | 20 | 20 |
|  | B (oil absorption number = 101) (Second carbon black) |  |  |  |  |  |
|  | D (oil absorption number = 75) (Third carbon black) |  |  |  |  |  |
|  | H (oil absorption number = 42) (Third carbon black) |  |  |  | 15 | 5 |
|  | F (oil absorption number = 29) (First carbon black) | 95 | 95 | 95 | 95 | 95 |
|  | G (oil absorption number = 28) (First carbon black) |  |  |  |  |  |
|  | Parts by mass content of calcium carbonate per 100 parts by mass of (CB1 + CB2) | 16 | 16 | 15 | 14 | 15 |
|  | Relationship (a): 11 × content 1 + 20 × content 2 (≥1080) | 1445 | 1445 | 1445 | 1445 | 1445 |
|  | Relationship (b): 2 × content 1 + 55 × content 2 (≥710) | 1290 | 1290 | 1290 | 1290 | 1290 |
|  | Relationship (c): 1 × content 1 + 35 × content 2 (≤1165) | 795 | 795 | 795 | 795 | 795 |
|  | Relationship (d): 21 × content 1 + 19 × content 2 (≤2985) | 2375 | 2375 | 2375 | 2375 | 2375 |
|  | kw of the third carbon black |  |  | 630 | 630 | 588 |
| Aliphatic isocyanate | HDI |  |  |  |  |  |
|  | HDI-biuret | 7 | 7 | 7 | 7 | 7 |
|  | TDI-isocyanurate |  |  |  |  |  |
|  | HDI-TMP modified product |  |  |  |  |  |
| Calcium carbonate | A (D50 = 8.5 μm) | 18 | 18 | 18 | 18 | 18 |
|  | B (D50 = 2.2 μm) |  |  |  |  |  |
| Metal catalyst | Sn catalyst (U810) |  | 0.01 | 0.01 | 0.01 | 0.01 |
|  | Bi catalyst (U600) |  |  |  |  |  |
|  | Ti catalyst (TC-750) | 0.01 |  |  |  |  |
| Amine catalyst | DMDEE | 0.1 |  | 0.1 | 0.1 | 0.1 |
|  | DMMDEE |  |  |  |  |  |
|  | TEDA |  | 0.1 |  |  |  |
| Properties of uncured material | Friction stability | Excel | Excel | Excel | Excel | Excel |
|  | SOD viscosity (Pa · s) | 74 | 83 | 104 | 107 | 103 |
|  | Viscosity stability (storage viscosity increase percentage) | 11 | 27 | 13 | 11 | 14 |
|  | TFT (min) | 52 | 39 | 38 | 37 | 38 |
|  | Flow resistance | 0 | 2 | 0 | 0 | 0 |
|  | Curing rate at deep portion | 1.5 | 1.7 | 1.8 | 1.9 | 1.8 |

TABLE 2-7-continued

|  |  | Examples | | | | |
| --- | --- | --- | --- | --- | --- | --- |
|  |  | 35 | 36 | 37 | 38 | 39 |
| Curing properties, Adhesion properties | Tensile elastic modulus (MPa) | 10.4 | 11.1 | 12.4 | 12.5 | 12.3 |
|  | Initial adhesion expression properties | Poor | CF | CF | CF | CF |
|  | Accelerated cure adhesion | Poor | CF | CF | CF | CF |
|  | Accelerated weathering adhesion | Poor | CF | CF | CF | CF |

TABLE 2-8

|  |  | Examples | | | |
| --- | --- | --- | --- | --- | --- |
|  |  | 40 | 41 | 42 | 43 |
| Carbon black | Urethane prepolymer 1 | 100 | 100 | 100 | 100 |
|  | E (oil absorption number = 130) (Third carbon black) |  |  |  |  |
|  | C (oil absorption number = 126) (Third carbon black) |  |  |  |  |
|  | A (oil absorption number = 115) (Second carbon black) | 20 | 20 | 20 | 20 |
|  | B (oil absorption number = 101) (Second carbon black) |  |  |  |  |
|  | D (oil absorption number = 75) (Third carbon black) |  |  |  |  |
|  | H (oil absorption number = 42) (Third carbon black) |  |  |  |  |
|  | F (oil absorption number = 29) (First carbon black) | 95 | 95 | 95 | 95 |
|  | G (oil absorption number = 28) (First carbon black) |  |  |  |  |
|  | Parts by mass content of calcium carbonate per 100 parts by mass of (CB1 + CB2) | 16 | 16 | 16 | 16 |
|  | Relationship (a): 11 × content 1 + 20 × content 2 (≥1080) | 1445 | 1445 | 1445 | 1445 |
|  | Relationship (b): 2 × content 1 + 55 × content 2 (≥710) | 1290 | 1290 | 1290 | 1290 |
|  | Relationship (c): 1 × content 1 + 35 × content 2 (≤1165) | 795 | 795 | 795 | 795 |
|  | Relationship (d): 21 × content 1 + 19 × content 2 (≤2985) | 2375 | 2375 | 2375 | 2375 |
|  | kw of the third carbon black |  |  |  |  |
| Aliphatic isocyanate | HDI |  |  |  |  |
|  | HDI-biuret | 7 | 7 | 7 | 7 |
|  | TDI-isocyanurate |  |  |  |  |
|  | HDI-TMP modified product |  |  |  |  |
| Calcium carbonate | A (D50 = 8.5 μm) | 18 | 18 | 18 | 18 |
|  | B (D50 = 2.2 μm) |  |  |  |  |
| Metal catalyst | Sn catalyst (U810) | 0.0003 | 0.04 | 0.01 | 0.01 |
|  | Bi catalyst (U600) |  |  |  |  |
|  | Ti catalyst (TC-750) |  |  |  |  |
| Amine catalyst | DMDEE | 0.1 | 0.1 | 0.01 | 0.5 |
|  | DMMDEE |  |  |  |  |
|  | TEDA |  |  |  |  |
| Properties of uncured material | Friction stability | Excel | Excel | Excel | Excel |
|  | SOD viscosity (Pa · s) | 75 | 77 | 72 | 83 |
|  | Viscosity stability (storage viscosity increase percentage) | 16 | 35 | 11 | 31 |
|  | TFT (min) | 52 | 28 | 93 | 19 |
|  | Flow resistance | 0 | 0 | 0 | 0 |
|  | Curing rate at deep portion | 1.5 | 1.9 | 1.1 | 2.1 |
| Curing properties, Adhesion properties | Tensile elastic modulus (MPa) | 10.1 | 11.3 | 10.6 | 12.1 |
|  | Initial adhesion expression properties | Poor | CF | CF | CF |
|  | Accelerated cure adhesion | CF | CF | CF | CF |
|  | Accelerated weathering adhesion | CF | CF | CF | CF |

Details of the components described in Table 1 or Table 2 are as follows.

In each table, the oil absorption number of a carbon black is the dibutyl phthalate oil absorption (DBP oil absorption) and the unit thereof is in cm$^3$/100 g.

Also, the contents of the urethane prepolymer 1 and 2 are net amounts of the urethane prepolymer.

Urethane prepolymer 1: Urethane prepolymer 1 containing isocyanate group in 1.95% was synthesized by mixing 500 g of polyoxypropylene diol (weight average molecular weight: 2000), 750 g of polyoxypropylene triol (weight average molecular weight: 5000), and 214 g of 4,4'-diisocyanate phenylmethane (molecular weight: 250) (NCO/OH=1.8 at this point), further adding 160 g of diisononyl phthalate, and stirring in a nitrogen gas stream at 80° C. for 24 hours to allow them to react.

Third Carbon Black
  Carbon black E: trade name #60HN, manufactured by Asahi Carbon Co., Ltd., DBP oil absorption 130 $cm^3/100$ g
  Carbon black C: trade name Niteron #300IN, manufactured by Nippon Steel Chemical Carbon Co. Ltd., DBP oil absorption 126 $cm^3/100$ g Second Carbon Black
  Carbon black A: trade name Niteron #300, manufactured by Nippon Steel Chemical Carbon Co. Ltd., DBP oil absorption 115 $cm^3/100$ g, ISAF grade
  Carbon black B: trade name: Niteron #200, manufactured by Nippon Steel Chemical Carbon Co. Ltd., DBP oil absorption 101 $cm^3/100$ g, HAF grade Third Carbon Black
  Carbon black D: trade name #70L, manufactured by Asahi Carbon Co., Ltd., DBP oil absorption 75 $cm^3/100$ g
  Carbon black H: trade name #50HG, manufactured by Asahi Carbon Co., Ltd., DBP oil absorption 42 $cm^3/100$ g First Carbon Black
  Carbon black F: trade name: Niteron #20, manufactured by Nippon Steel Chemical Carbon Co. Ltd., DBP oil absorption 29 $cm^3/100$ g, FT grade
  Carbon black G: trade name Asahi Thermal, manufactured by Asahi Carbon Co., Ltd., DBP oil absorption 28 $cm^3/100$ g, FT grade
  HDI: hexamethylene diisocyanate, manufactured by Asahi Kasei Chemical Corporation
  HDI-biuret: HDI biuret represented by Formula (7) above (D165N, manufactured by Mitsui-Takeda Urethane Chemicals)
  HDI-isocyanurate: HDI isocyanurate represented by Formula (8) above (D170N, manufactured by Mitsui-Takeda Urethane Chemicals)
  HDI-TMP modified product: HDI-TMP adduct represented by Formula (5) above (synthesized product) Note that the synthesis was performed by adding TMP dropwise while stirring to a flask in which HDI was added in advance, so as to give an equivalent ratio of NCO/OH of 2.0, and then allowing them to react at 80° C. for 24 hours.
  Calcium carbonate A: heavy calcium carbonate, D50 of 8.5 μm (Super S, manufactured by Maruo Calcium Co., Ltd.)
  Calcium carbonate B: heavy calcium carbonate, D50 of 2.2 μm (trade name Super 2000, manufactured by Maruo Calcium Co., Ltd.)
  Sn Catalyst: dioctyltin laurate (NEOSTANN U-810, manufactured by Nitto Kasei Co., Ltd.)
  Bi catalyst: inorganic bismuth (NEOSTANN U-600, manufactured by Nitto Kasei Co., Ltd.)
  Ti catalyst: diisopropoxy bis(ethylacetoacetate)titanium (ORGATIX TC-750, manufactured by Matsumoto Fine Chemical Co. Ltd.)
  Catalyst DMDEE: dimorpholinodiethyl ether (manufactured by San-Apro Ltd.)
  Catalyst DMDEE: di(methylmorpholino)diethylether (trade name U-CAT 651M, manufactured by San-Apro Ltd.)
  TEDA: triethylenediamine (DABCO, manufactured by Air Products)

As shown in Table 1, Comparative Example 1 containing only the second carbon black exhibited poor friction stability.

Comparative Examples 2 and 3 containing the second carbon blacks in the contents out of the specific ranges exhibited poor friction stability.

Comparative Example 4 containing the calcium carbonate in the content out of the specific range based on the content of the urethane prepolymer exhibited poor friction stability.

Comparative Example 5 containing the calcium carbonate in the content out of the specific range based on the content of the urethane prepolymer and the calcium carbonate in the content out of the specific range based on the sum of the content 1 and content 2 exhibited poor friction stability.

Comparative Example 6 containing the calcium carbonate in the content out of the specific range based on the sum of the content 1 and content 2 exhibited poor friction stability.

In contrast, the composition of the present technology was found to exhibit the desired effect as shown in Table 2.

Also, it was found that when the aliphatic isocyanate in the composition of the present technology was the trifunctional compound A modified from hexamethylene diisocyanate, cured products with a high rigidity were obtained (comparison between Example 1 and Example 33).

It was found that when the first carbon black and the second carbon black in the composition of the present technology satisfied the relationships (a) to (d) (Examples 1 to 25), the compositions exhibited superior friction stability, lower viscosity of the composition, excellent flow resistance, or resulted in cured products with high rigidity, as compared to those not satisfying any of the relationships (a) to (d) (Examples 26 to 32).

It was found that when the metal catalyst in the composition of the present technology contained the organotin catalyst in the specified content, the compositions exhibited excellent adhesion to the coated plate without applying any primer (which can be evaluated by the initial adhesion expression properties), achieved greater curing rate of the composition, and resulted in cured products with high rigidity (comparison of Example 1 with Examples 34, 35, and 40).

It was found that when the amine catalyst in the composition of the present technology contained the compound having a dimorpholinodiethyl ether structure in the specified content, the compositions exhibited lower viscosity and excellent flow resistance, achieved greater curing rate of the composition, and resulted in cured products with high rigidity (comparison of Examples 1 and 21 with Example 36).

TABLE 3

|  |  | Examples | | | | | | | Comparative example |
|---|---|---|---|---|---|---|---|---|---|
|  |  | 1 | 2 | 3 | 4 | 5 | 6 | 7 | 1 |
| Urethane prepolymer 2 |  | 100 | 100 | 100 | 100 | 100 | 100 | 100 | 100 |
| Carbon black | F (oil absorption number = 29) (First carbon black) | 40 | 80 | 80 | 40 | 45 | 90 | 90 | 20 |
|  | A (oil absorption number = 115) (Second carbon black) | 40 | 38 | 25 | 25 | 35 | 45 | 15 | 40 |
|  | Parts by mass content of calcium carbonate per 100 parts by mass of (CB1 + CB2) | 22.5 | 15.3 | 17.1 | 27.7 | 22.5 | 13.3 | 17.1 | 30.0 |
|  | Relationship (e): 4 × content 1 + 59 × content 2 (<2694) | 2520 | 2562 | 1795 | 1635 | 2245 | 3015 | 1245 | 2440 |
|  | Relationship (f): 11 × content 1 + 2 × content 2 (<1004) | 520 | 956 | 930 | 490 | 565 | 1080 | 1020 | 300 |
|  | Relationship (g): 1 × content 1 + 16 × content 2 (>376) | 680 | 688 | 480 | 440 | 605 | 810 | 330 | 660 |
|  | Relationship (h): 23 × content 1 + 15 × content 2 (>1235) | 1520 | 2410 | 2215 | 1295 | 1560 | 2745 | 2295 | 1060 |
| Aliphatic isocyanate | HDI-biuret | 7 | 7 | 7 | 7 | 7 | 7 | 7 | 7 |
| Calcium carbonate | A (D50 = 8.5 μm) | 18 | 18 | 18 | 18 | 18 | 18 | 18 | 18 |
| Metal catalyst | Sn catalyst (U810) | 0.01 | 0.01 | 0.01 | 0.01 | 0.01 | 0.01 | 0.01 | 0.01 |
| Amine catalyst | DMDEE | 0.1 | 0.1 | 0.1 | 0.1 | 0.1 | 0.1 | 0.1 | 0.1 |
| Properties of uncured material | Friction stability | Excel | Excel | Excel | Excel | Excel | Excel | Fair | Poor |
|  | SOD viscosity (Pa·s) | 55 | 83 | 80 | 55 | 84 | 110 | 55 | 50 |
|  | Viscosity stability (Storage viscosity increase percentage) | 19 | 17 | 20 | 17 | 17 | 20 | 20 | 19 |
|  | TFT (min) | 29 | 28 | 29 | 30 | 28 | 31 | 30 | 30 |
|  | Flow resistance | 1 | 0 | 1 | 1 | 0 | 0 | 3 | 3 |
|  | Curing rate at deep portion | 1.7 | 1.8 | 1.6 | 2.1 | 1.8 | 1.8 | 1.6 | 1.8 |
| Curing properties, Adhesion properties | Tensile elastic modulus (MPa) | 8.2 | 11.7 | 9.9 | 8.6 | 10.5 | 10.1 | 8.9 | 7.8 |
|  | Initial adhesion expression properties | CF | CF | CF | CF | CF | CF | CF | CF |
|  | Accelerated cure adhesion | CF | CF | CF | CF | CF | CF | CF | CF |
|  | Accelerated weathering adhesion | CF | CF | CF | CF | CF | CF | CF | CF |

Details of the components described in Table 3 are as follows.

Urethane prepolymer 2: Urethane prepolymer 2 containing isocyanate group in 1.95% was synthesized by mixing 200 g of polyoxypropylene diol (average molecular weight 2000), 300 g of polyoxypropylene triol (average molecular weight 4000), and 92 g of 4,4'-diisocyanate phenylmethane (molecular weight 250) (NCO/OH=1.7 at this point), further adding 130 g of diisononyl phthalate, and stirring in a nitrogen gas stream at 80° C. for 24 hours to allow them to react.

First Carbon Black

Carbon black F: trade name Niteron #20, manufactured by Nippon Steel Chemical Carbon Co. Ltd., DBP oil absorption 29 cm$^3$/100 g, FT grade Second Carbon Black Carbon black A: trade name Niteron #300, manufactured by Nippon Steel Chemical Carbon Co. Ltd., DBP oil absorption 115 cm$^3$/100 g, ISAF grade HDI-Biuret: an HDI biuret represented by formula (7) above (D165N, manufactured by Mitsui-Takeda Urethane Chemicals)

Calcium carbonate A: heavy calcium carbonate, D50 of 8.5 μm (Super S, manufactured by Maruo Calcium Co., Ltd.)

Sn catalyst: dioctyltin laurate (NEOSTANN U-810, manufactured by Nitto Kasei Co., Ltd.)

DMDEE: dimorpholinodiethyl ether (manufactured by San-Apro Ltd.)

As evident from the results shown in Table 3, Comparative Example 1 containing the first carbon black in the content out of the specific range exhibited poor friction stability.

In contrast, the composition of the present technology was found to achieve the desired effect as shown in Table 3.

The invention claimed is:

1. A one-part moisture curing-type adhesive composition comprising a urethane prepolymer, carbon black, calcium carbonate, aliphatic isocyanate, a metal catalyst, and an amine catalyst, wherein the carbon black comprises plural types of carbon blacks;

a first carbon black has a dibutyl phthalate oil absorption of from 23 to 40 cm$^3$/100 g;

a second carbon black has a dibutyl phthalate oil absorption of from 85 to 120 cm$^3$/100 g;

a content 1 of the first carbon black is not less than 25 parts by mass per 100 parts by mass of the urethane prepolymer;

a content 2 of the second carbon black is not less than 9 parts by mass per 100 parts by mass of the urethane prepolymer;

a content of the calcium carbonate is from 5 to 30 parts by mass per 100 parts by mass of the urethane prepolymer; and a content of the calcium carbonate is from 5 to 50 parts by mass per 100 parts by mass of a sum of the content 1 and the content 2.

2. The adhesive composition according to claim 1, wherein the content 1 is not greater than 140 parts by mass per 100 parts by mass of the urethane prepolymer.

3. The adhesive composition according to claim 1, wherein the content 2 is not greater than 45 parts by mass per 100 parts by mass of the urethane prepolymer.

4. The adhesive composition according to claim 1, wherein the aliphatic isocyanate is a trifunctional compound A that is modified from hexamethylene diisocyanate.

5. The adhesive composition according to claim 1, wherein the content of the aliphatic isocyanate is from 4 to 14 parts by mass per 100 parts by mass of the urethane prepolymer.

6. The adhesive composition according to claim 1, wherein the metal catalyst comprises an organotin catalyst.

7. The adhesive composition according to claim 1, wherein the content of the metal catalyst is from 0.0004 to 0.03 parts by mass per 100 parts by mass of the urethane prepolymer.

8. The adhesive composition according to claim 1, wherein the amine catalyst has a dimorpholinodiethylether structure.

9. The adhesive composition according to claim 1, wherein the content of the amine catalyst is from 0.02 to 0.4 parts by mass per 100 parts by mass of the urethane prepolymer.

10. The adhesive composition according to claim 1 further comprising a third carbon black, wherein a value of k×w is not greater than 650, where k is a dibutyl phthalate oil absorption of the third carbon black in cm$^3$/100 g, and w is a content of the third carbon black in parts by mass per 100 parts by mass of the urethane prepolymer.

11. The adhesive composition according to claim 1, wherein the content 1 and the content 2 satisfy the following relationships (a) to (d), or relationships (e) to (h):

| | |
|---|---|
| 11×content 1+20×content 2≥1080; | Relationship (a) |
| 2×content 1+55×content 2≥710; | Relationship (b) |
| 1×content 1+35×content 2≤1165; | Relationship (c) |
| 21×content 1+19×content 2≤2985; | Relationship (d) |
| 59×content 2<−4×content 1+2694; | Relationship (e) |
| 2×content 2<−11×content 1+1004; | Relationship (f) |
| 16×content 2>−1×content 1+376; and | Relationship (g) |
| 15×content 2>−23×content 1+1235. | Relationship (h) |

12. The adhesive composition according to claim 1, wherein the dibutyl phthalate oil absorption of the first carbon black is from 23 to 33 cm$^3$/100 g;

the dibutyl phthalate oil absorption of the second carbon black is from 95 to 120 cm$^3$/100 g; and the content 1 and the content 2 satisfy the following relationships (a) to (d):

| | |
|---|---|
| 11×content 1+20×content 2≥1080; | Relationship (a) |
| 2×content 1+55×content 2≥710; | Relationship (b) |
| 1×content 1+35×content 2≤1165; and | Relationship (c) |
| 21×content 1+19×content 2≤2985. | Relationship (d) |

13. The adhesive composition according to claim 1, wherein the dibutyl phthalate oil absorption of the first carbon black is from 28 to 40 cm$^3$/100 g;

the dibutyl phthalate oil absorption of the second carbon black is from 85 to 115 cm$^3$/100 g; and the content 1 and the content 2 satisfy the following relationships (e) to (h):

| | |
|---|---|
| 59×content 2<−4×content 1+2694; | Relationship (e) |
| 2×content 2<−11×content 1+1004; | Relationship (f) |
| 16×content 2>−1×content 1+376; and | Relationship (g) |
| 15×content 2>−23×content 1+1235. | Relationship (h) |

* * * * *